(12) United States Patent  
Hong et al.

(10) Patent No.: US 8,768,044 B2
(45) Date of Patent: Jul. 1, 2014

(54) AUTOMATIC CONVERGENCE OF STEREOSCOPIC IMAGES BASED ON DISPARITY MAPS

(75) Inventors: Wei Hong, Sunnyvale, CA (US); Aziz Umit Batur, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 189 days.

(21) Appl. No.: 13/224,324

(22) Filed: Sep. 1, 2011

(65) Prior Publication Data

US 2012/0063669 A1 Mar. 15, 2012

Related U.S. Application Data

(60) Provisional application No. 61/382,530, filed on Sep. 14, 2010.

(51) Int. Cl.
*G06K 9/00* (2006.01)
*G06K 9/34* (2006.01)
*G06K 9/40* (2006.01)
*G06K 9/32* (2006.01)

(52) U.S. Cl.
USPC ............ 382/154; 382/180; 382/254; 382/294

(58) Field of Classification Search
None
See application file for complete search history.

(56) References Cited

U.S. PATENT DOCUMENTS

| | | | |
|---|---|---|---|
| 2007/0248260 A1 | 10/2007 | Pockett | |
| 2008/0112616 A1* | 5/2008 | Koo et al. | 382/171 |
| 2009/0096863 A1* | 4/2009 | Kim et al. | 348/42 |
| 2010/0002073 A1 | 1/2010 | Robinson et al. | |
| 2011/0002680 A1 | 1/2011 | Narasimha et al. | |
| 2011/0012998 A1 | 1/2011 | Pan | |
| 2011/0019989 A1 | 1/2011 | Tanaka | |
| 2011/0074928 A1 | 3/2011 | Misawa | |
| 2011/0080466 A1* | 4/2011 | Kask et al. | 348/43 |
| 2011/0134212 A1 | 6/2011 | Neuman et al. | |

OTHER PUBLICATIONS

Sreenivas Kothandaraman et al, "Stereoscopic Image Pair Alignment Apparatus, Systems and Methods", U.S. Appl. No. 13/082,354, filed Apr. 7, 2011, pp. 1-38.

J.S. McVeigh et al, "Algorithm for Automated Eye Strain Reduction in Real Stereoscopic Images and Sequences", Proceedings of the SPIE, Human Vision and Electronic Imaging, vol. 2657, Feb. 1996, pp. 307-316.

(Continued)

*Primary Examiner* — Barry Drennan
*Assistant Examiner* — David F Dunphy
(74) *Attorney, Agent, or Firm* — Mirna Abyad; Frederick J Telecky, Jr.

(57) ABSTRACT

A method for automatic convergence of stereoscopic images is provided that includes receiving a stereoscopic image, generating a disparity map comprising a plurality of blocks for the stereoscopic image, clustering the plurality of blocks into a plurality of clusters based on disparities of the blocks, selecting a cluster of the plurality of clusters with a smallest disparity as a foreground cluster, determining a first shift amount and a first shift direction and a second shift amount and a second shift direction based on the smallest disparity, and shifting a left image in the stereoscopic image in the first shift direction by the first shift amount and a right image in the stereoscopic image in the second shift direction by the second shift amount, wherein the smallest disparity is reduced.

20 Claims, 4 Drawing Sheets

(56) References Cited

OTHER PUBLICATIONS

Jasmine Banks and Peter Corke, "Quantitative Evaluation of Matching Methods and Validity Measures for Stereo Vision", The International Journal of Robotics Research 2001, Sage Publications, pp. 512-532.

Myron Z. Brown et al, "Advances in Computational Stereo", IEEE Transactions on Pattern Analysis and Machine Intelligence, vol. 25, No. 8, Aug. 2003, pp. 993-1008.

E.A. Hendriks et al, "A Hardware Realisation of a Block Based Disparity Estimator on a CMOS Sea-of-Gates Semi-Custom Chip", Proceedings International Workshop on Stereoscopic and Three Dimensional Imaging, Santorini, Greece, 1995, pp. 305-310.

"Cluster analysis", Wikipedia, available at http://en.wikipedia.org/wiki/Cluster_analysis on Aug. 28, 2011.

* cited by examiner

AUTOMATIC CONVERGENCE OF STEREOSCOPIC IMAGES BASED ON DISPARITY MAPS

CROSS-REFERENCE TO RELATED APPLICATIONS

This application claims benefit of U.S. Provisional Patent Application Ser. No. 61/382,530, filed Sep. 14, 2010, which is incorporated by reference herein in its entirety.

BACKGROUND OF THE INVENTION

1. Field of the Invention

Embodiments of the present invention generally relate to automatic convergence of stereoscopic images based on disparity maps.

2. Description of the Related Art

In human visual systems or stereoscopic camera systems, the point of intersection of the two eye axes or two camera axes is the convergence point. The distance from the convergence point to the eye or camera is the convergence distance. For human eyes, the convergence point can be at an arbitrary distance. For stereoscopic cameras, the convergence point may be, for example, at infinity (for a parallel camera configuration) or at a fixed distance (for a toe-in camera configuration).

When a person looks at stereoscopic images on a stereoscopic display, the eyes naturally converge to the display screen. The distance from the display screen to the eyes is the natural convergence distance. However, to view the 3D effect correctly, the viewer's eyes adjust to have the same convergence distance as the camera. Such constant convergence distance adjustment can cause discomfort over time such as headaches or eye muscle pain.

SUMMARY

Embodiments of the present invention relate to a method, apparatus, and computer readable medium for automatic convergence of stereoscopic images based on disparity maps. In one aspect, automatic convergence of a stereoscopic image includes generating a disparity map comprising a plurality of blocks for the stereoscopic image, clustering the plurality of blocks into a plurality of clusters based on disparities of the blocks, selecting a cluster of the plurality of clusters with a smallest disparity as a foreground cluster, determining a first shift amount and a first shift direction and a second shift amount and a second shift direction based on the smallest disparity, and shifting a left image in the stereoscopic image in the first shift direction by the first shift amount and a right image in the stereoscopic image in the second shift direction by the second shift amount, wherein the smallest disparity is reduced.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

A stereoscopic image is a three dimensional (3D) representation of a scene. Further, a stereoscopic image may include two two dimensional (2D) images, a left image and a right image, that are obtained, for example, by imaging sensors positioned at slightly different viewpoints such that the same objects appear in each image but are shifted horizontally in one image relative to the other. Further, objects at different depths in the scene will have different displacements in the left and right images, thus creating a sense of depth when the stereoscopic image is viewed on a stereoscopic display. The left and right 2D images may be corresponding frames of two video sequences or corresponding single still 2D images. Thus, a stereoscopic image may be two corresponding frames of two video sequences or two corresponding still 2D images.

The term disparity refers to the shift that occurs at each point in a scene between the left and right images. This shift may be mostly horizontal when the imaging sensors used to capture the left and right images are offset horizontally. Further, the amount of shift or disparity may vary from pixel to pixel depending on the depth of the corresponding 3D point in the scene. At the point of convergence, corresponding objects in the left and right images are said to have zero horizontal disparity and, when viewed on a stereoscopic display, will appear to be on the display plane. Objects in front of the convergence point will have negative disparity, i.e., an object in the left image is horizontally shifted to the right of the corresponding object in the right image and will appear in front of the display plane. Objects behind the convergence point will have positive disparity, i.e., an object in the left image is horizontally shifted to the left of the corresponding object in the right image and will appear to be behind the display plane.

Typically, objects on the display plane and behind the display plane can be viewed comfortably but objects in front of the display plane can cause viewing discomfort, eye muscle pain, and even headache over time. In order to improve visual comfort, negative disparity should be avoided or reduced. Further, very large positive disparity can cause viewing discomfort when the stereoscopic images are viewed on a large screen. That is, if the positive disparity is larger than human eye separation, the eyes have to diverge which can cause discomfort.

To improve viewing comfort, the convergence distance of a stereoscopic image can be adjusted so that the convergence distance approximates the natural convergence distance of human eyes. Such adjustment of the convergence distance may be accomplished by horizontally shifting the left image and/or the right image of the stereoscopic image, i.e., by changing the horizontal disparity between the left and right images.

Embodiments of the invention provide for automatic convergence of stereoscopic images based on disparity maps. More specifically, the convergence distance of a stereoscopic image is automatically reduced based on a disparity map computed for the image. One or more foreground regions in the stereoscopic image are identified from the disparity map and the left and right images are shifted horizontally based on the average disparity of these foreground regions.

Many existing prior art automatic convergence techniques either converge to the center of the scene or need additional input such as an auto-focus location, a face location, or a finger-touch position. The techniques that converge to the center of the scene may not perform well when the foreground object is not at the center of the scene or there are multiple foreground objects. The techniques requiring additional input may not perform well if the additional input is not available. In contrast, the automatic convergence based on disparity maps described herein does not require additional input beyond the stereoscopic images and the foreground object(s) can be located anywhere in the images.

Figure 1:
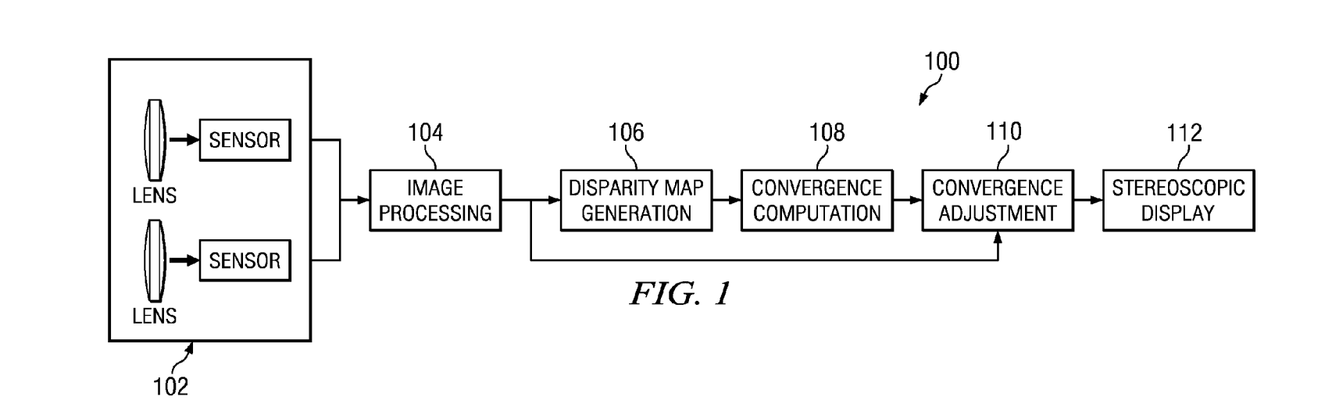
FIG. 1 shows a block diagram of a stereoscopic imaging system.

FIG. 1 shows a block diagram of stereoscopic imaging system 100 in accordance with one or more embodiments. The stereoscopic imaging system 100 includes a stereo imaging component 102, an image processing component 104, a disparity map generation component 106, a convergence computation component 108, a convergence adjustment component 110, and a stereoscopic display 112.

The stereo imaging component 102 includes two lens configurations, two apertures, and two imaging sensors arranged to capture image signals of a scene from a left viewpoint and a right viewpoint. That is, one lens configuration, aperture, and imaging sensor is arranged to capture an image signal from the left viewpoint, i.e., a left analog image signal, and the other lens configuration, aperture, and imaging sensor is arranged to capture an image signal from the right view point, i.e., a right analog image signal. A lens configuration and aperture may be any suitable lens configuration and aperture. For example, a lens configuration may include a zoom lens and a focus lens. An imaging sensor may be any suitable imaging sensor such as, for example, a CMOS (Complementary Metal-Oxide Semiconductor) or CCD (Charge Coupled Device) image sensor. The stereo imaging component 102 also includes circuitry for controlling various aspects of the operation of the component, such as, for example, lens position, aperture opening amount, exposure time, etc. The stereo imaging component 102 further includes functionality to convert the left and right analog image signals to left and right digital image signals and to provide the left and right digital image signals to the image processing component 104.

The image processing component 104 divides the left and right digital signals into left and right digital images, and processes each digital image to enhance the scene in the digital image. The image processing performed may include one or more image enhancement techniques such as, for example, black clamping, fault pixel correction, color filter array (CFA) interpolation, gamma correction, white balancing, color space conversion, edge enhancement, detection of the quality of the lens focus for auto focusing, and detection of average scene brightness for auto exposure adjustment.

Figure 2A:
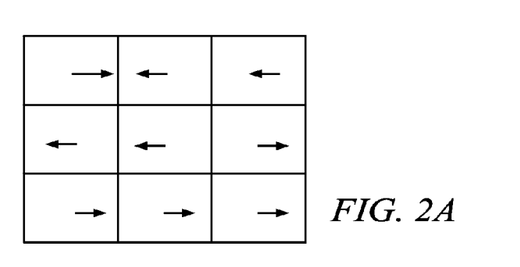
FIGS. 2A-2D show an example.

The disparity map generation component 106 processes the left and right images of a stereoscopic image to generate a disparity map for the stereoscopic image. To generate the disparity map, the stereoscopic image is divided into m×n non-overlapping blocks and a disparity value is estimated for each block. Any suitable block size may be used, such as, for example, m=3 and n=3. In general, the block size is chosen as a tradeoff between computation time and inclusion of sufficient pixels to allow features to be distinguished from background noise. The disparity value for each block may be estimated using any suitable block-based disparity estimation technique that provides block disparity values $D\_i, i=1 \ldots N$ and corresponding confidence values $C\_i, i=1 \ldots N$, where N is the number of blocks. A confidence value is an indication of the accuracy of the corresponding disparity value. A block disparity value can be positive, zero, or negative. FIG. 2A shows a simple example of a disparity map.

The disparity of a block in the stereoscopic image may be estimated, for example, by finding for each block in the right image the relative location of a block in the left image that minimizes a distortion function. The search for the minimum distortion block in the left image may be search over a predetermined horizontal search range centered on the corresponding block in the left image. That is, the left block is shifted across the search range and the distortion function is computed at each shift location. Common distortion functions that may be used include, for example, mean-squared error (MSE), mean-squared difference (MSD), sum of the squared differences (SSD), and sum of absolute differences (SAD). The shift amount of the left block that results in the minimum distortion is the disparity value of the block in the stereoscopic image. The disparity values may also be calculated using a block-based boundary signal technique as described in U.S. patent application Ser. No. 13/082,354 filed on Apr. 7, 2011.

Figure 2B:
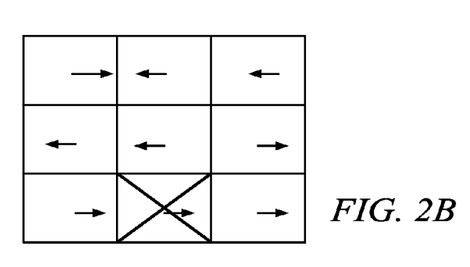

The convergence computation component 108 analyzes a disparity map generated by the disparity map generation component 106 to determine how much and in which direction each of the left and right images of the corresponding stereoscopic image should be shifted horizontally. The convergence computation component 108 operates as follows. First, the confidence values $C\_i$ of each of the blocks in the disparity map are compared to a confidence threshold. The confidence threshold may be empirically predetermined and/or may be user-specified. If the confidence value of a block is less than the confidence threshold, the disparity estimation for the block is considered to be unreliable and the block is ignored for further processing. FIG. 2B shows the example disparity map of FIG. 2A in which one block, i.e., the block that is crossed out, has been eliminated as being unreliable.

Figure 2C:
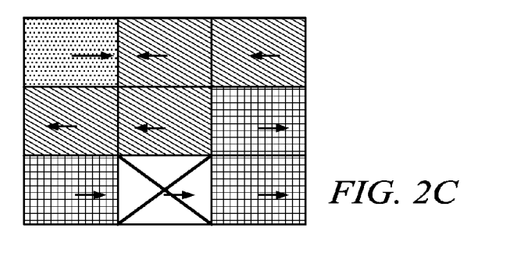

Once the unreliable blocks are eliminated, the blocks in the disparity map are clustered based on the similarity of the disparities. In general, the goal of the clustering is that blocks with the same or very close disparity values are grouped into the same clusters. Any suitable clustering technique, e.g., k-means clustering, may be used. An overview of some suitable clustering techniques is provided in "Cluster Analysis", Wikipedia, Wikipedia Foundation Inc., available at http://en.wikipedia.org/wiki/Cluster_analysis (last visited Aug. 28, 2011). The disparity of a cluster of blocks is the average of the disparities of the blocks in the cluster. FIG. 2C shows the example disparity map of FIG. 2B after clustering. In this example, the blocks are clustered into three groups.

Figure 2D:
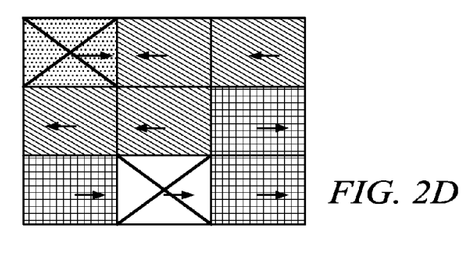

After clustering, unreliable clusters are eliminated. That is, the number of blocks in each cluster is compared to a cluster size threshold. The cluster size threshold may be empirically predetermined and/or may be user-specified. If the number of blocks in a cluster is below the cluster size threshold, the cluster is considered to be unreliable and is ignored for further processing. FIG. 2D shows the example disparity map of FIG. 2C in which one cluster, i.e., the cluster that is crossed out, has been eliminated as being unreliable.

The foreground object(s) in a scene should have the smallest disparity. Accordingly, the cluster with the smallest disparity is selected as the foreground cluster. In some embodiments, the disparity of this foreground cluster is used to determine the shift values and directions for the left and right images. However, it may be desirable to leave a certain amount of negative disparity between the left and right images to allow some objects to appear in front of the display plane. Accordingly, in some embodiments, the foreground cluster disparity is adjusted by a maximum negative disparity amount, i.e., $$D\_f = D\_f - D\_\text{max\_negative}$$

where D_f is the foreground cluster disparity and D_max_negative is the maximum negative disparity amount. The maximum negative disparity amount may be empirically predetermined and/or may be user-specified.

It may also be desirable to limit the maximum positive disparity of the background of the image to reduce eye divergence. Note that the background of the image should have the largest disparity. Thus, the cluster with the largest disparity is the background cluster. In some embodiments, the foreground disparity is adjusted to limit positive disparity if the difference between the foreground cluster disparity and the background cluster disparity is larger than a maximum positive disparity amount, i.e., if $$D\_b - D\_f > D\_\text{max\_positive},$$

where D_b is the background cluster disparity and D_max_positive is the maximum positive disparity amount. If the above condition is true, then the foreground cluster disparity is adjusted, i.e., $$D\_f = D\_b - D\_\text{max\_positive}.$$

The maximum positive disparity amount may be empirically predetermined and/or may be user-specified.

In a video sequence, when a foreground object moves into or moves out of the scene, the estimated foreground cluster disparity D_f changes drastically from image to image. Accordingly, in some embodiments, to avoid abrupt changes in the shift amounts, an infinite impulse response (IIR) low-pass filter is applied to D_f, i.e., $$D\_f(n) = D\_f(n-1)*C + D\_f(n)*(1-C)$$

where C controls how fast the shift amount may change and n is the frame number. This low-pass filter also reduces the risk of inaccurate disparity estimation for some troublesome images. The value of C may be empirically predetermined and/or may be user-specified.

To determine the shift amounts, the final foreground cluster disparity D_f is divided by 2. If D_f is an even integer, the shift amount for each image is |D_f|/2. If D_f is an odd integer, the shift amount for one image is rnd(|D_f|/2) and for the other image is rnd(|D_f|/2)−1. The shift directions are based on the sign of the foreground cluster disparity D_f. If D_f is negative, the shift direction for the left image is left and the shift direction for the right image is right. If D_f is positive, the shift direction for the left image is right and the shift direction for the right image is left.

The convergence adjustment component 110 generates a final stereoscopic image by shifting a left image horizontally according to a left image shift amount and a left image shift direction determined by the convergence computation component 108 and shifting a right image horizontally according to a right image shift amount and a right image shift direction determined by the convergence computation component 108. The convergence adjustment component 110 outputs the resulting stereoscopic images for further processing. The further processing may include, for example, displaying the stereoscopic images on the stereoscopic display 112, and encoding the stereoscopic images for storage and/or transmission.

The stereoscopic display 112 is a display configured to present stereoscopic images to a user of the stereoscopic imaging system 100 in a manner that allows stereoscopic vision. The stereoscopic display 112 may be any suitable display device capable of displaying stereoscopic content. For example, the stereoscopic display 112 may be a 2D or 3D display device, e.g., a 2D or 3D liquid crystal display (LCD) device, for which the stereoscopic images are converted to anaglyph images that require special glasses to view the 3D effect. In another example, the stereoscopic display 112 may be a display with optical components that enable viewing of the 3D effect without special glasses, such as, for example, a stereoscopic 3D LCD device or a stereoscopic 3D organic electroluminescent display device.

The stereoscopic imaging system 100 may be configured to operate as follows to capture stereoscopic images of a scene and automatically converge the stereoscopic images. A left image and a right image of a stereoscopic image of a scene are captured and processed by the stereoscopic imaging component 102 and the image processing component 104. The disparity map generation component 106 receives the processed stereoscopic image and generates a disparity map for the image. The convergence computation component 108 then uses the disparity map to determine shift values and directions for the left and right images. The convergence adjustment component 110 then shifts the left image horizontally in the specified direction by the left image shift amount and the right image horizontally in the specified direction by the right image shift amount to converge the stereoscopic image.

The automatic convergence may be performed, for example, on preview stereoscopic images during view finding, on stereoscopic images that are being recorded, and on previously recorded stereoscopic images. In some embodiments, the components of the stereoscopic imaging system 100 are embodied in a single digital system. The single digital system may be, for example, a cellular telephone, a smart cellular telephone, a laptop computer, a netbook computer, a tablet computing device, or a handheld gaming device. In some embodiments, different components may be embodied in separate digital systems. For example, the stereoscopic imaging component and the image processing component may be embodied in a digital camera and the other components may be embodied in a digital system that receives processed stereoscopic images from the camera.

Components of the stereoscopic imaging system 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, any software instructions may be stored in memory (not specifically shown) in the stereoscopic imaging system 100 and executed by one or more processors. The software instructions may be initially stored in a computer-readable medium such as a compact disc (CD), a diskette, a tape, a file, memory, or any other computer readable storage device and loaded and stored on the stereoscopic imaging system 100. In some cases, the software instructions may also be sold in a computer program product, which includes the computer-readable medium and packaging materials for the computer-readable medium. In some cases, the software instructions may be distributed to the stereoscopic imaging system 100 via removable computer readable media (e.g., floppy disk, optical disk, flash memory, USB key), via a transmission path from computer readable media on another computer system (e.g., a server), etc.

Figure 3:
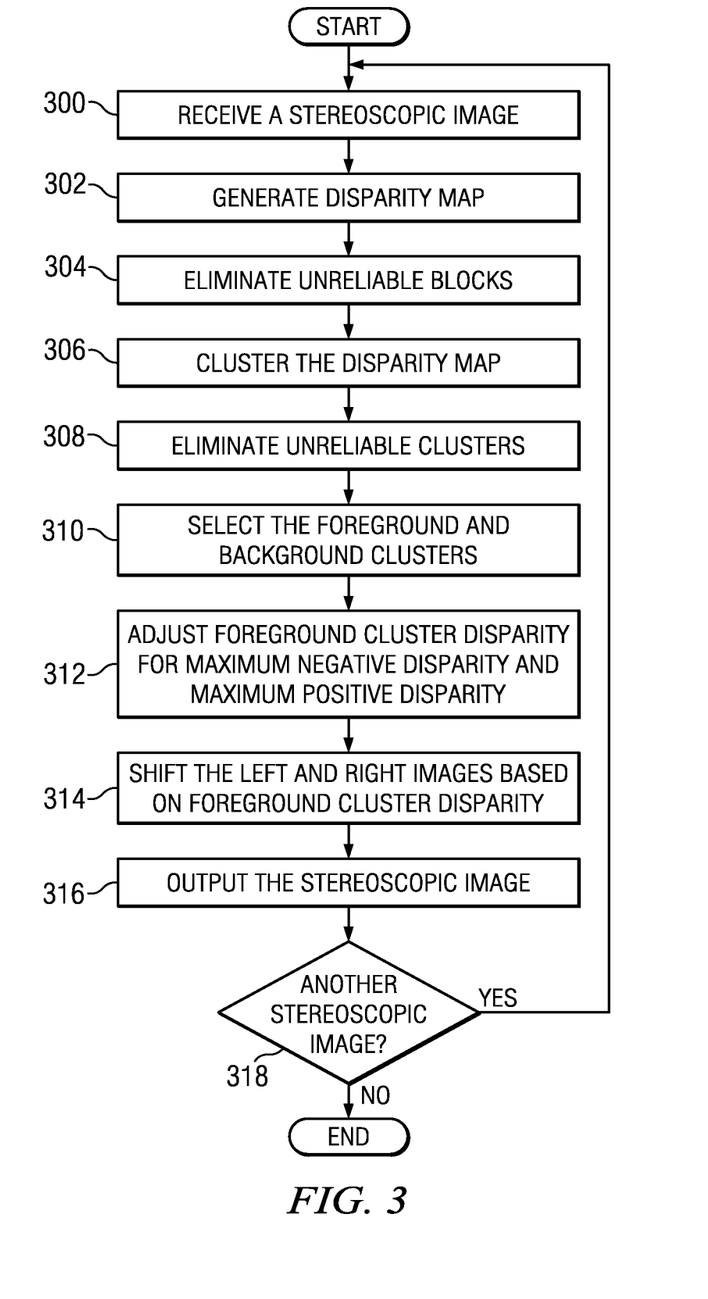
FIG. 3 shows a flow diagram of a method for automatic convergence of stereoscopic images.

FIG. 3 shows a flow diagram of a method for automatic convergence of stereoscopic images based on disparity maps. In general, the method generates a disparity map for a stereoscopic image, determines shift values and directions for the left and right images of the stereoscopic image based on the disparity map, and shifts the left and right images according to the respective shift values and directions to converge the image. The method may be performed, for example, during view finding when preview images are captured and displayed, during recording of stereoscopic images, and during review of previously recorded stereoscopic images.

As shown in FIG. 3, initially a stereoscopic image is received 300. A disparity map is then generated for the stereoscopic image 302. That is, the stereoscopic image is divided into n×m blocks and a disparity value and a confidence value is determined for each block. Generation of a disparity map is previously described herein. Once the disparity map is generated, unreliable blocks, if any, are eliminated from the disparity map 304. For example, if a confidence value of a block is less than a confidence threshold, the block may be eliminated from the disparity map, i.e., is ignored in further processing. The confidence threshold may be empirically predetermined and/or may be user-specified.

The remaining blocks in the disparity map are then clustered based on the similarity of the disparities 306. Clustering of a disparity map is previously described herein. Unreliable clusters, i.e., clusters that are too small, are then eliminated 308. For example, if the number of blocks in a cluster is less than a cluster size threshold, the cluster is eliminated from the disparity map, i.e., is ignored in further processing. The cluster size threshold may be empirically predetermined and/or may be user-specified. A disparity for each cluster is also computed. The disparity of a cluster is the average of the disparity values of the blocks in the cluster.

The foreground and background clusters are then selected from the clustered disparity map 310. The cluster with the smallest disparity is selected as the foreground cluster and the cluster with the largest disparity is selected as the background cluster. The disparity of the foreground cluster is then adjusted based on a maximum negative disparity, a maximum positive disparity, and the disparity of the background cluster 312. The maximum negative disparity and the maximum positive disparity may be empirically predetermined and/or user-specified. Adjustment of the foreground cluster disparity is previously described herein.

The left and right images of the stereoscopic image are then shifted based on the foreground cluster disparity 314. That is, shift values and directions for the left and right images are determined based on the foreground cluster disparity, and the images are shifted according the respective amount and direction. Determination of shift values and directions from the foreground cluster disparity is previously described herein. The stereoscopic image is then output 316, and the next stereoscopic image, if any 318, is processed.

Figure 4A:
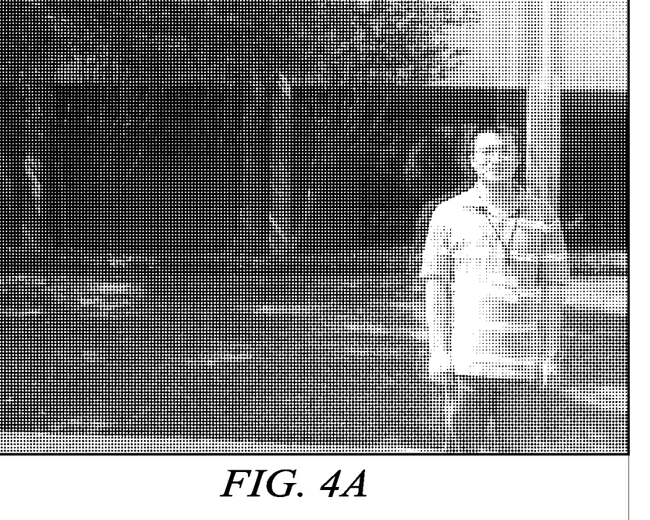
FIGS. 4A and 4B show an example.
Figure 4B:
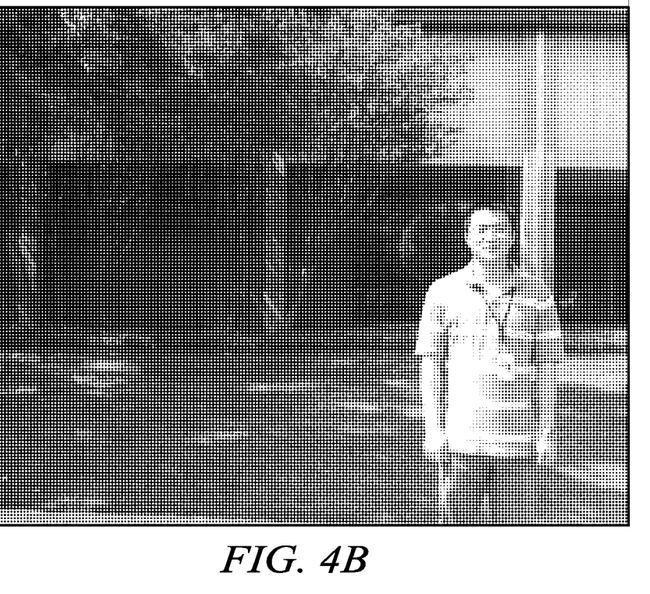

FIGS. 4A and 4B show a simple example of application of an embodiment of the automatic convergence method to a still stereoscopic image, i.e., a stereoscopic photograph. FIG. 4A shows the stereoscopic image before convergence and FIG. 4B shows the converged stereoscopic image after the automatic convergence method is applied.

Figure 5:
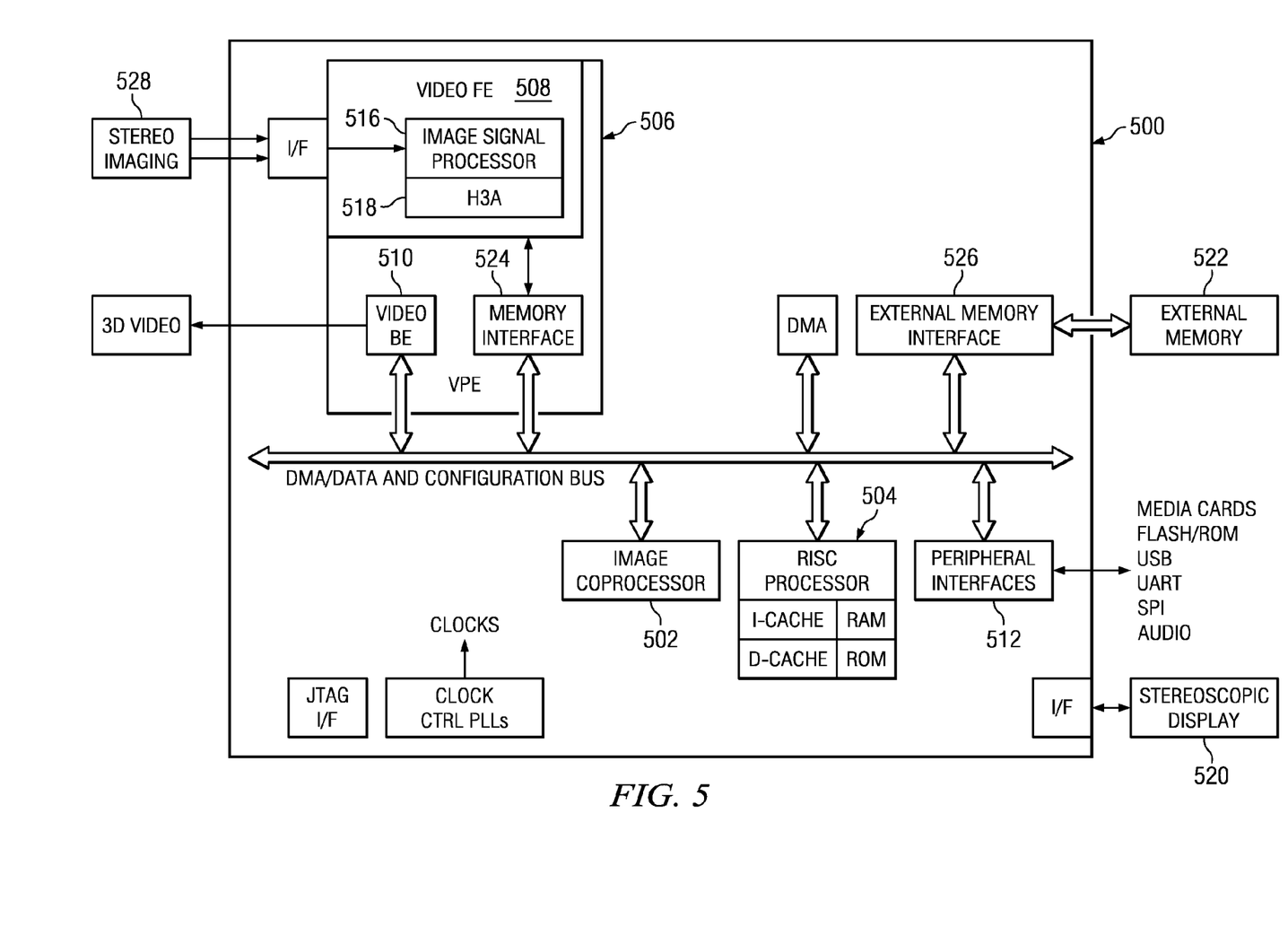
FIG. 5 shows a block diagram of an illustrative digital system.

FIG. 5 shows an illustrative digital system 500 suitable for use as an embedded system, e.g., in a digital camera or a cellular telephone, in accordance with one or more embodiments. The digital system 500 includes, among other components, an image coprocessor (ICP) 502, a RISC processor 504, and a video processing engine (VPE) 506 that may be configured to perform automatic convergence of stereoscopic images as described herein. The digital system 500 also includes an interface for a stereoscopic display 520, an external memory interface 526, and peripheral interfaces 512 for various peripherals that may include a multi-media card, an audio serial port, a Universal Serial Bus (USB) controller, a serial port interface, etc.

The RISC processor 504 may be any suitably configured RISC processor. The ICP 502 may be, for example, a digital signal processor (DSP) or other processor designed to accelerate image processing.

The VPE 506 includes a configurable video processing front-end (Video FE) 508 input interface used for stereoscopic image capture from a stereoscopic imaging peripheral 508, a configurable video processing back-end (Video BE) 510 output interface used for stereoscopic display devices, and a memory interface 524 shared by the Video FE 508 and the Video BE 510.

The Video FE 508 includes functionality to perform image enhancement techniques on raw stereoscopic image data from a stereoscopic imaging peripheral 528. The image enhancement techniques may include, for example, black clamping, fault pixel correction, color filter array (CFA) interpolation, gamma correction, white balancing, color space conversion, edge enhancement, detection of the quality of the lens focus for auto focusing, and detection of average scene brightness for auto exposure adjustment. The Video FE 508 includes an image signal processor (ISP) 516, and an H3A statistic generator 3A) 518. The ISP 516 is customizable for various imaging sensor types, e.g., CCD or CMOS, and supports video frame rates for preview displays of captured stereoscopic images and for video and still image recording modes. The ISP 516 also includes, among other functionality, an image resizer, statistics collection functionality, and a boundary signal calculator. The H3A module 518 includes functionality to support control loops for auto focus, auto white balance, and auto exposure by collecting metrics on the raw image data from the ISP 516 or external memory 522.

The Video BE 510 includes functionality to manage display data in various formats for several different types of stereoscopic display devices, and to format display data into the output format and output signals required to interface to various stereoscopic display devices.

The memory interface 524 functions as the primary source and sink to modules in the Video FE 508 and the Video BE 510 that are requesting and/or transferring data to/from external memory 522. The memory interface 524 includes read and write buffers and arbitration logic.

The digital system 500 may be configured to operate as follows. The Video FE 508 receives stereoscopic image data for a stereoscopic image from the stereoscopic imaging peripheral 528, applies enhancement techniques to the left and right images, and stores the images in external memory 522. The ICP 502 retrieves the images from the external memory 522. Software executing on the ICP 502 generates a disparity map and determines shift amounts and shift directions for horizontally shifting the left and right images based on the disparity map. The ICP 502 then shifts the left image and the right image according the respective shift amounts and shift directions, and stores the final stereoscopic image in the external memory 522. Camera control software executing on the RISC processor 504 retrieves the final stereoscopic image from the external memory 522, and displays the stereoscopic image on the stereoscopic display 520.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the automatic convergence method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

What is claimed is:

1. A method for automatic convergence of stereoscopic images, the method comprising:
   receiving a stereoscopic image;
   generating a disparity map comprising a plurality of blocks for the stereoscopic image;
   clustering the plurality of blocks into a plurality of clusters based on disparities of the blocks, wherein the disparity of a cluster of blocks is the average of the disparities of the blocks in the cluster;
   selecting a cluster of the plurality of clusters with a smallest disparity as a foreground cluster;
   determining a first shift amount and a first shift direction and a second shift amount and a second shift direction based on the smallest disparity; and
   shifting a left image in the stereoscopic image in the first shift direction by the first shift amount and a right image in the stereoscopic image in the second shift direction by the second shift amount, wherein the smallest disparity is reduced.

2. The method of claim 1, further comprising:
   adjusting the smallest disparity by a maximum negative disparity amount prior to the determining.

3. The method of claim 2, further comprising:
   adjusting the adjusted smallest disparity based on a maximum positive disparity amount prior to the determining.

4. The method of claim 3, wherein adjusting the adjusted smallest disparity amount based on a maximum positive disparity comprises:
   selecting a cluster of the plurality of clusters with a largest disparity as a background cluster; and
   subtracting a difference between the largest disparity and the maximum positive disparity amount from the adjusted smallest disparity when a difference between the largest disparity and the smallest disparity is greater than the maximum positive disparity amount.

5. The method of claim 1, further comprising:
   filtering the smallest disparity prior to the determining.

6. The method of claim 1, further comprising:
   identifying at least one unreliable cluster in the plurality of clusters prior to the selecting a cluster.

7. The method of claim 1, further comprising:
   displaying the stereoscopic image on a stereoscopic display.

8. An apparatus comprising:
   means for generating a disparity map for a stereoscopic image, the disparity map comprising a plurality of blocks;
   means for clustering the plurality of blocks into a plurality of clusters based on disparities of the blocks;
   means for selecting a cluster of the plurality of clusters with a smallest disparity as a foreground cluster;
   means for determining a first shift amount and a first shift direction and a second shift amount and a second shift direction based on the smallest disparity; and
   means for shifting a left image in the stereoscopic image in the first shift direction by the first shift amount and a right image in the stereoscopic image in the second shift direction by the second shift amount, wherein the smallest disparity is reduced.

9. The apparatus of claim 8, further comprising:
   a stereo imaging component configured to capture the stereoscopic image.

10. The apparatus of claim 8, wherein the means for determining adjusts the smallest disparity by a maximum negative disparity amount prior to determining the shift amounts and shift directions.

11. The apparatus of claim 10, wherein the means for determining adjusts the adjusted smallest disparity by a maximum positive disparity amount prior to determining the shift amounts and shift directions.

12. The apparatus of claim 11, wherein the means for determining adjusts the adjusted smallest disparity by
   selecting a cluster of the plurality of clusters with a largest disparity as a background cluster; and
   subtracting a difference between the largest disparity and the maximum positive disparity amount from the adjusted smallest disparity when a difference between the largest disparity and the smallest disparity is greater than the maximum positive disparity amount.

13. The apparatus of claim 8, wherein the means for determining filters the smallest disparity prior to determining the shift amounts and shift directions.

14. The apparatus of claim 8, further comprising:
   means for identifying at least one unreliable cluster in the plurality of clusters prior to the selecting a cluster.

15. A non-transitory computer readable medium storing software instructions that when executed in a digital system cause the digital system to perform a method comprising:
   generating a disparity map comprising a plurality of blocks for a stereoscopic image;
   clustering the plurality of blocks into a plurality of clusters based on disparities of the blocks, wherein the disparity of a cluster of blocks is the average of the disparities of the blocks in the cluster;
   selecting a cluster of the plurality of clusters with a smallest disparity as a foreground cluster;
   determining a first shift amount and a first shift direction and a second shift amount and a second shift direction based on the smallest disparity; and
   shifting a left image in the stereoscopic image in the first shift direction by the first shift amount and a right image in the stereoscopic image in the second shift direction by the second shift amount, wherein the smallest disparity is reduced.

16. The non-transitory computer readable medium of claim 15, wherein the method further comprises:
    adjusting the smallest disparity by a maximum negative disparity amount prior to the determining.

17. The non-transitory computer readable medium of claim 16, wherein the method further comprises:
    adjusting the adjusted smallest disparity based on a maximum positive disparity amount prior to the determining.

18. The non-transitory computer readable medium of claim 17, wherein adjusting the adjusted smallest disparity amount based on a maximum positive disparity comprises:
    selecting a cluster of the plurality of clusters with a largest disparity as a background cluster; and
    subtracting a difference between the largest disparity and the maximum positive disparity amount from the adjusted smallest disparity when a difference between the largest disparity and the smallest disparity is greater than the maximum positive disparity amount.

19. The computer readable medium of claim 15, further comprising:
    filtering the smallest disparity prior to the determining.

20. The computer readable medium of claim 15, further comprising:
    identifying at least one unreliable cluster in the plurality of clusters prior to the selecting a cluster.

* * * * *